Dec. 15, 1925.
J. W. CASSIE
1,565,623
FRUIT SIZING MACHINE
Filed May 11, 1925   2 Sheets-Sheet 1
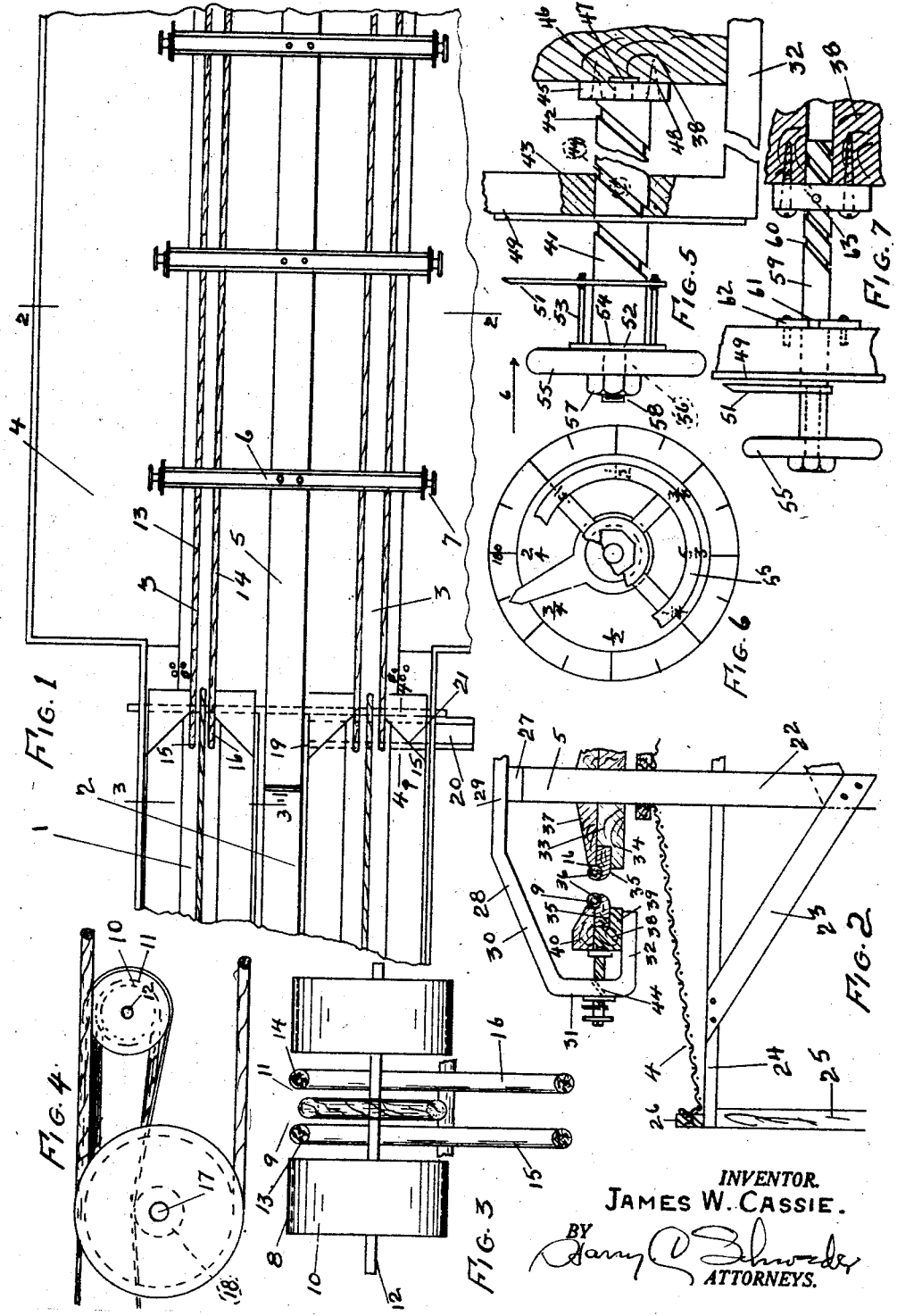
INVENTOR.
JAMES W. CASSIE.
BY
ATTORNEYS.

Dec. 15, 1925.

J. W. CASSIE 1,565,623

FRUIT SIZING MACHINE

Filed May 11, 1925

INVENTOR.
JAMES W. CASSIE,
BY
ATTORNEYS.

Patented Dec. 15, 1925.

1,565,623

UNITED STATES PATENT OFFICE.

JAMES W. CASSIE, OF COURTLAND, CALIFORNIA.

FRUIT-SIZING MACHINE.

Application filed May 11, 1925. Serial No. 29,329.

*To all whom it may concern:*

Be it known that I, JAMES W. CASSIE, a citizen of the United States, residing at Courtland, in the county of Sacramento and State of California, have invented certain new and useful Improvements in Fruit-Sizing Machines, of which the following is a specification.

My invention is an improved grading and sizing machine adapted particularly for fruits and vegetables.

An object of my invention is to provide a feeding carrier having a pair of parallel belts and a rope between the belts so that the articles being graded are carried by the three moving elements. Sizing conveyors, preferably of the continuous rope type, lead between and overlap the feeding carriers so that the fruit is moved continuously from the feeding carriers to the sizing conveyors in the same horizontal plane without dropping or undue rolling of the fruit.

The belts used in connection with the central rope carrier enable a more thorough inspection of the fruit to be made by the operators grading and culling the fruit.

Another object of my invention is to provide a sizing conveyor with two continuous operating ropes running in substantially a direct line from one end of the machine to the other. These ropes run in guide rods, one of which is preferably stationary and the other is formed of a continuous long length of timber which is sufficiently flexible so that it may be bent sideways to increase or decrease the distance between the guide rods. In the method of operating my fruit sizer, I may position the movable guide rod in order to handle fruit of substantially a uniform size and distribute it to a plurality of packing bins. This I do by placing a control device at each packing bin so that the packer may adjust the flexible guideway in or out to pass fruit on to a succeeding packer or to receive fruit.

An accurate control gauge is a feature of the invention which enables the packer to readily see what size of fruit his particular bin is receiving: and the construction shown consists of a gauged disc and a pointer, these being relatively operable so that by turning a handle the packer moves the flexible guide rod in and out thereby securing in accordance the size of fruit desired.

My invention will be more readily understood from the following description and drawing in which:—

Figure 1 is a plan view of part of the feed carriers for the grader and part of the conveyors for the sizing machine.

Figure 2 is an enlarged cross section of the sizing machine as if taken on the line 2—2 of Figure 1, showing the brackets for holding the movable guide rod and the indicator for adjusting such guide rod.

Figure 3 is an enlarged diagrammatic section of the feeding carrier as if taken on the line 3—3 of Figure 1, indicating the overlapping of the feeding carrier and sizing conveyor.

Figure 4 is an enlarged diagrammatic side elevation taken on the line 4—4 of Figure 1 in the direction of the arrow 4, showing the overlapping of the feeding carrier and sorting conveyor.

Figure 5 is an enlarged section of the movable guide rod adjustor showing the gauge for indicating the size of fruit.

Figure 6 is a front elevation of Figure 5 in the direction of the arrow 6.

Figure 7 is a modification of the construction of Figure 5 in which the indicating disc and the pointer remain a fixed distance apart.

Figure 8:
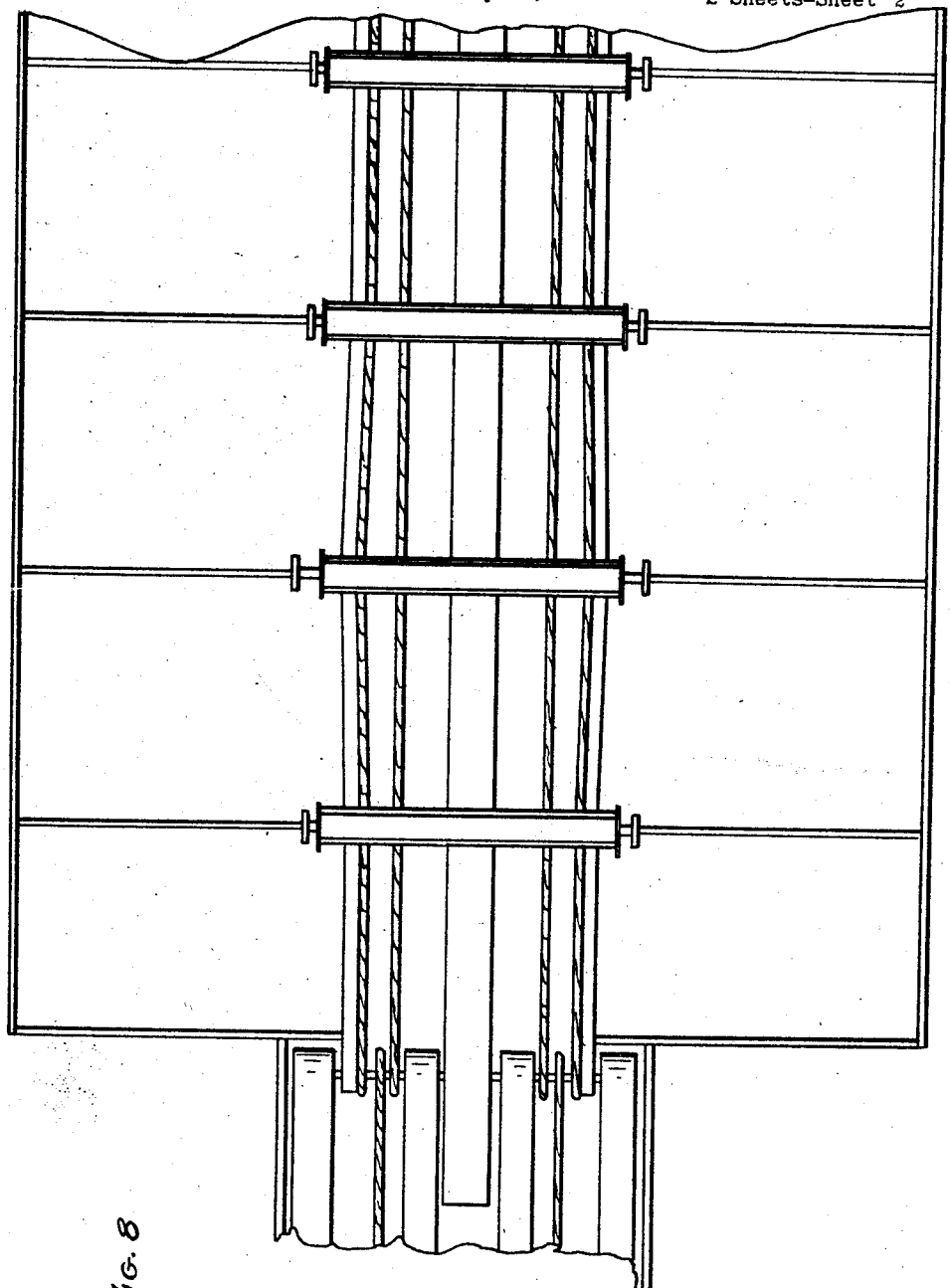

Figure 8 a plan view of a portion of my device showing the guides flexed, the flexing being exaggerated since any amount of flexing necessary for the purposes of invention would not be noticeable in a drawing reduced like Figure 8.

Referring to the drawings, the machine as indicated is of the double type: that is, having two sets of conveyors and packing bins on opposite sides. It comprises a set of feeding carriers 1, a culling belt 2 situated therebetween, a plurality of supporting guide rods and conveyors 3, bins 4, a longitudinal frame 5, supporting cross brackets 6 and a sizing indicator and guide rod control 7.

The grading carriers are constructed as follows: Referring to Figures 1, 2 and 3, each carrier comprises a pair of belts 8, having a traveling rope 9 carried therebetween. The belts at the transfer end are carried on drums 10 and the rope on a pulley 11, both sets being either fixed to a rotating shaft 12 or loosely mounted thereon in accordance with the particular system of drive. The sizing conveyors comprise a pair of ropes 13 and 14, shown at the transfer end as being carried by groove pulleys 15 and 16; each are shown of substantially twice the diameter of the drums 10, and the pulley 11, and are intended to be interdriven by any suitable driving connection between the shaft 12 and the shaft 17 carrying the large pulleys. The idlers 18 lift the belts 8 and the rope 9 above the shaft 17.

The operation of the feeding carriers is as follows: a certain amount of the fruit will rest on the belts 8 and some will likewise contact with both the ropes and the belts. Both the ropes and the belts are designed to travel at the same speed and carry a large quantity of fruit for inspection by the fruit graders, who usually sort the fruit into two grades by transferring it from one set of carriers to the other and placing the culls on belt 2 between the double sets of carriers and leading to discharge chutes 19 and 20. The fruit as it is carried along, meets deflectors 21 which move the fruit off the belts into engagement with the sizing conveyor ropes 13 and 14 and the center rope 9. This is accomplished with the fruit all on the one level and thereby it is handled without any drop or rough handling.

The sizing machine is constructed as follows:

The bins 4 are of the usual character and are supported at the center by the frame 5 which is shown consisting of a vertical post 22 and lateral braces 23 extending to the supports 24 of the bins, while outside legs 25 support the rim 26 of the bins. The posts 22 carry a longitudinal bar 27, across which is suitably secured at intervals a bracket 28 constructed of a metal bar or a channel, having a horizontal part 29 and an inclined portion 30, a vertical face 31 and a guide supporting arm 32. The fixed guide rod 33 is preferably built up of three sections with a rectangular bar 34, a rope holder 35 of hard wood having a groove 36 for the fixed rope 14 and an upper clamp bar 37. These elements are all secured together in suitable manner and fastened to the posts 22.

The movable guide rod 38 comprises a main bar 39, the rope holder 35 having a groove 36 for shiftable rope 13 and a clamping bar 40. These elements are all secured together in a suitable manner; each of the elements are in one continuous piece from one end of the supporter to the other and, as the shiftable guide rod 38 is designed to extend in one piece from one end of the sorting machine to the other, and as these are sometimes required in lengths of forty feet and over, it is sometimes necessary to splice the different elements. In doing this a type of splice should be used which will allow sufficient flexibility of the guide rod so that it may bend as hereafter described.

The guide control element 7 and the packers' gauge is constructed as follows:—

As illustrated particularly in Figures 2 and 5, a screw-threaded bar 41, preferably having square groove threads 42, passes through an aperture 43 in the face 31 of the bracket 28. The pin 44 extends through a side of the brace and has an inner end engaging in the threaded groove 42. The inner end of the bar is rotatably mounted in a face plate 45 by means of the narrow neck 46 and the enlarged head 47. The face plate is secured to the shiftable guide rod 38 by wood screws 48 or the like.

A gauged disc 49, having indices 50, to indicate the diameter of the fruit or its size number is secured in a fixed position on the face 31 of the bracket 28. A pointer 51 is held from rotation on the bar 41 by means of a washer 52 and connecting studs 53 secured to the pointer. This washer bears against the shoulder 54 of the bar 41 and is held in place by the handle 55, which fits the square end 56 of the bar and is held in rigid position by the nut 57 on the screw-threaded end 58. In this manner the pointer turns with the handle and the shiftable guide rod 38 is moved in or out by the bar 41 threading through the bracket 28 in accordance with the direction of rotation of the handle, the guide rod sliding on the guide rod supporting arm 32.

In Figure 7 the threaded bar 59 has threads 60 and an annular groove 61 engaged by yoke plates 62 fixed to the bracket 28. As the handle is turned, it operates the guide rod 38 in and out through the medium of the nut plate 63, engaging the threads 60 and itself being fixed to the guide rod. The pointer is held in rigid position on the threaded bar and close to the face of the disc 49, and thereby shows the spacing of the movable guide rod. The method of operating the sizing machine is as follows:—

Usually the fruit runs mostly to a uniform size, with a small proportion being small, with another small proportion being large; therefore the fixed guide rod is positioned at the feed-in end to drop the small size and at its outer end to either drop or carry along the largest size. For the uniform size fruit the guide rod control device and indicators are operated to bend the shiftable guide 38 so that a succession of bins will receive substantially the same size of fruit. As the fruit is fed through the sizer, this uniform fruit will drop through the first space available and fill up one of the bins near the feeding-in end. The packer at this bin will then turn the handle 55 to move the guide rod 38 inwardly, and thereby pass the fruit on to the next bin. The packer at this bin will then repeat the same operation when his bin is filled, and so on. If all the packers handle the same size fruit, the first packer of this size, when his bin is empty, will then turn the handle 55 until the pointer shows the diameter or size number for this uniform fruit, when his bin will again become filled. The shiftable guide rod 38 can be made sufficiently flexible so that no joints are required to form sharp angles or requiring hinges, as the grooves 36 and the rope holder 35 will hold the shifting rope through considerable movement without it drawing out of the groove on the outward curvature of the flexible guide rod.

No details of a driving mechanism for either the feeding carriers or the sorting conveyors is shown, as these could be of any type such as that shown in my application, Serial No. 724,594, filed April 7, 1924, for a fruit grader, of which this is an improvement.

The construction of my machine in its various features, and the manner of operation may be considerably modified to suit special circumstances, the kind of fruit or vegetables being handled, etc., without departing from the spirit of the invention.

The pulley 11 is slightly smaller than the drums 10 to lower the rope 9 and overlap slightly. The ropes 13 and 14 are on substantially the same level as the belts 8.

Having described my invention, what I claim is:—

1. A fruit sizer comprising in combination a pair of spaced guide rods adapted to size fruit therebetween, rope conveyors operable in said guide rods, the guide rods and ropes being continuous from one end of the sizer to the other, one of said guide rods being fixed and the other shiftable laterally thereto, means to bend the shiftable guide rod to alter the distance apart at different positions of its length, said conveyors remaining in contact with said guide rods.

2. A fruit sizer as claimed in claim 1, in which the means to flex the shiftable guide rods comprises a threaded screw, an operative connection between the screw and the guide rod, a support for the screw, means to turn the screw, and an indicating gauge to indicate different positions of the shiftable guide rod.

3. In a fruit sizer of the character described, a pair of flexible guide rods extending uninterruptedly from end to end and having conveying means associated therewith and means for bending one of the guide rods at different places intermediate the ends thereof for effecting independent spacing for different sections of the guide elements.

4. In a fruit sizer of the character described, a pair of spaced flexible guide rods extending uninterruptedly from end to end and having conveying means associated therewith and means for bending one of the guide rods at different places intermediate the ends thereof for effecting independent spacing for different sections of the guide elements in combination with means for gauging the spacing at the adjusting places.

5. A fruit sizer comprising a pair of resilient guide rods spaced laterally from each other, a conveyor associated with said guide rods, a series of flexing elements spaced longitudinally of said guide rods, said flexing elements being adapted to engage one of said guide rods, whereby the guide rod may be flexed inwardly or outwardly at various points along its length.

6. A fruit sizer comprising a pair of spaced guide rods adapted to size fruit therebetween, rope conveyors operable in said guide rods, the rods and ropes being continuous from one end of the sizer to the other, one of said rods being fixed and the other shiftable laterally thereto, said shiftable rod being supported at a plurality of positions along its length, and independent adjusting means for bending said shiftable rod at each of said positions.

7. A fruit sizer comprising a fixed guide rod and a flexible guide rod spaced therefrom, each of said guide rods being provided with a longitudinal groove, rope conveyors operable in said grooves, means for independently flexing said flexible guide rod at a plurality of points along its length, and indicators cooperating with said flexing means for indicating the relative amount of said flexing.

In testimony whereof I affix my signature.

JAMES W. CASSIE.